(12) United States Patent
Singh et al.

(10) Patent No.: US 11,544,495 B2
(45) Date of Patent: Jan. 3, 2023

(54) ATTRIBUTIONALLY ROBUST TRAINING FOR WEAKLY SUPERVISED LOCALIZATION AND SEGMENTATION

(71) Applicant: Adobe Inc., San Jose, CA (US)

(72) Inventors: Mayank Singh, Uttar Pradesh (IN); Balaji Krishnamurthy, Uttar Pradesh (IN); Nupur Kumari, Uttar Pradesh (IN); Puneet Mangla, Haryana (IN)

(73) Assignee: Adobe Inc., San Jose, CA (US)

( * ) Notice: Subject to any disclaimer, the term of this patent is extended or adjusted under 35 U.S.C. 154(b) by 44 days.

(21) Appl. No.: 16/926,511

(22) Filed: Jul. 10, 2020

(65) Prior Publication Data

US 2022/0012530 A1   Jan. 13, 2022

(51) Int. Cl.
*G06K 9/00* (2022.01)
*G06K 9/62* (2022.01)
*G06N 3/08* (2006.01)
*G06N 3/04* (2006.01)
*G06T 7/11* (2017.01)

(52) U.S. Cl.
CPC ......... *G06K 9/6256* (2013.01); *G06K 9/6262* (2013.01); *G06N 3/04* (2013.01); *G06N 3/08* (2013.01); *G06T 7/11* (2017.01); *G06T 2207/20081* (2013.01); *G06T 2207/20084* (2013.01)

(58) Field of Classification Search
CPC ...... G06K 9/6256; G06K 9/6262; G06N 3/04; G06N 3/08; G06T 7/11; G06T 2207/20081; G06T 2207/20084
See application file for complete search history.

(56) References Cited

U.S. PATENT DOCUMENTS

2021/0312232 A1* 10/2021 Tensmeyer ........... G06K 9/6232
2021/0334935 A1* 10/2021 Grigoriev ............. G06T 3/0093

OTHER PUBLICATIONS

Chattopadhyay, A. et al., "Grad-CAM++: Generalized Gradient-Based Visual Explanations for Deep Convolutional Networks," arXiv:1710.11063v3, Nov. 7, 2018, pp. 1-6.
Choe, J. et al., "Attention-based Dropout Layer for Weakly Supervised Object Localization," Proceedings of the IEEE Conference on Computer Vision and Pattern Recognition, 2019, pp. 2219-2228.
(Continued)

*Primary Examiner* — Ping Y Hsieh
(74) *Attorney, Agent, or Firm* — Nicholson De Vos Webster & Elliott LLP

(57) ABSTRACT

Embodiments are disclosed for training a neural network classifier to learn to more closely align an input image with its attribution map. In particular, in one or more embodiments, the disclosed systems and methods comprise receiving a training image comprising a representation of one or more objects, the training image associated with at least one label for the representation of the one or more objects, generating a perturbed training image based on the training image using a neural network, and training the neural network using the perturbed training image by minimizing a combination of classification loss and attribution loss to learn to align an image with its corresponding attribution map.

20 Claims, 12 Drawing Sheets

(56) References Cited

OTHER PUBLICATIONS

Dombrowski, A.-K. et al., "Explanations can be manipulated and geometry is to blame," arXiv:1906.07983v2 [stat.ML], Sep. 25, 2019, 34 pages.

He, K. et al., "Deep residual learning for image recognition," arXiv:1512.03385v1 [cs.CV], Dec. 10, 2015, 12 pages.

Jiang, Q. et al., "Weakly-Supervised Image Semantic Segmentation Based on Superpixel Region Merging," Big Data and Cognitive Computing, 3:31, Jun. 2019, 20 pages.

Kolesnikov, A. et al., "Seed, Expand and Constrain: Three Principles for Weakly-Supervised Image Segmentation," arXiv:1603.06098v3 [cs.CV], Aug. 6, 2016, 20 pages.

Madry, A. et al., "Towards Deep Learning Models Resistant to Adversarial Attacks," arXiv:1706.06083v4 [stat.ML], Sep. 4, 2019, 28 pages.

Nilsback, M.-E. et al., "Delving deeper into the whorl of flower segmentation," Image Vision Comput., 28(6), Oct. 2009, pp. 1049-1062.

Oh, S.J. et al., "Exploiting Saliency for Object Segmentation from Image Level Labels," arXiv:1701.08261v2 [cs.CV], Jul. 14, 2017, 20 pages.

Simonyan, K. et al., "Deep Inside Convolutional Networks: Visualising image Classification Models and Saliency Maps," arXiv:1312.6034v2 [cs.CV], Apr. 19, 2014, 8 pages.

Simonyan, K. et al., "Very Deep Convolutional Networks for Large-Scale Image Recognition," arXiv:1409.1556v6 [cs.CV], Apr. 10, 2015, 14 pages.

Sundararajan, M. et al., "Axiomatic Attribution for Deep Networks," Proceedings of the 34th International Conference on Machine Learning, PMLR 70, 2017, pp. 3319-3328.

Vasconcelos, M. et al., Weakly Supervised Top-down Image Segmentation, IEEE Computer Society Conference on Computer Vision and Pattern Recognition (CVPR'06), vol. 1, 2006, pp. 1001-1006.

Vezhnevets, A. et al., Towards Weakly Supervised Semantic Segmentation by Means of Multiple Instance and Multitask Learning, 2010 IEEE Computer Society Conference on Computer Vision and Pattern Recognition, Jun. 2010, pp. 3249-3256.

Wah, C. et al., "The Caltech-UCSD Birds-200-2011 Dataset," Technical Report CNS-TR-2011-001, 2011, 9 pages.

Zhang, L. et al., "Probabilistic Graphlet Cut: Exploiting Spatial Structure Cue for Weakly Supervised Image Segmentation," 2013 IEEE Conference on Computer Vision and Pattern Recognition, 2013, pp. 1908-1915.

Zhang, X. et al., "Self-produced Guidance for Weakly-Supervised Object Localization," Computer Vision—ECCV 2018, Lecture Notes in Computer Science, vol. 11216, Oct. 2018, 17 pages.

Zhang, X. et al., "Adversarial Complementary Learning for Weakly Supervised Object Localization," 2018 IEEE/CVF Conference on Computer Vision and Pattern Recognition, Apr. 19, 2018, pp. 1325-1334.

Zhou, B. et al., "Learning Deep Features for Discriminative Localization," 2016 IEEE Conference on Computer Vision and Pattern Recognition (CVPR), 2016, pp. 2921-2929.

\* cited by examiner

ATTRIBUTIONALLY ROBUST TRAINING FOR WEAKLY SUPERVISED LOCALIZATION AND SEGMENTATION

BACKGROUND

1. Technical Field

The present disclosure relates generally to systems and methods for image classification. More specifically, one or more embodiments of the present disclosure relate to systems and methods that implement an improved training technique for machine learning models that provides improved localization and segmentation in image classification tasks.

2. Background and Relevant Art

Deep convolutional networks (CNNs) have become a regular ingredient for numerous contemporary computer vision tasks. They have been applied to tasks such as object recognition, semantic segmentation, object detection, etc. to achieve state-of-the-art performance. However, the at par performance of deep neural networks requires a significant number of supervisory examples for training. Several machine learning tasks that use CNNs require rich labeled training data. Creating labeled training data is time consuming and expensive, and publicly available labeled datasets are rare. As such, there is a growing need for alternative approaches to training machine learning models that do not require such richly labeled training data.

For example, Weakly Supervised Object Localization (WSOL), aims to learn a classification model in a fashion that promotes the model to localize objects in the image. The motivation for this stems from the hypothesis that a model with good classification accuracy should also be able to identify the object region in the image. Prior work in object localization using weak supervision usually exploit model interpretation techniques like image saliency along with class label while training. Thus, a common baseline for comparison is a naturally trained classification model and using image attribution methods like class activation mapping (CAM) for bounding box prediction. For example, a bounding box is obtained from the machine learning model based on an attribution map for each image and then a bounding box is fit on the largest connected region in the attribution map with values above a specific threshold.

A common problem with prior approaches is that the model only relies on the most discriminative part of the object instead of complete object. For example, in the case of a bird, the model, for example, relies on the beak region for classification rather than the entire bird's shape which results in less than accurate localization. As a result, the attribution map is often significantly smaller than the object being identified, leading to inaccurate localization. Prior attempts to improve attribution maps have modified the training procedure of the classifier by training the model after removing the most discriminative part of the image or by adding additional classifiers. However, the resulting attribution maps from these techniques are still sub-optimal.

These and other problems exist with regard to designing user interfaces and user experiences in electronic systems.

BRIEF SUMMARY

Introduced here are techniques/technologies that train a neural network classifier to learn to align an input image more closely with its attribution map. Contrary to prior approaches, embodiments use a training methodology for obtaining better attribution maps by training a neural network to produce attribution maps that are robust to small perturbations in images and more aligned with human perception. In some embodiments, soft-margin triplet loss is used to promote the alignment of an input with its attribution map. The soft-margin triplet loss considers the input image as the anchor, a gradient of the correct class logit with respect to input as the positive, and the gradient of a worst incorrect class logit with respect to input as the negative. The intuition behind this choice of loss is that the gradient of the correct class logit with respect to input should have the highest similarity with input as compared to gradient of any other class logit with respect to input.

In particular, in one or more embodiments, the disclosed systems and methods include receive a training image comprising a representation of one or more objects, the training image associated with at least one label for the representation of the one or more objects. generate a perturbed training image based on the training image using a neural network, and train the neural network using the perturbed training image by minimizing a combination of classification loss and attribution loss to learn to align an image with its corresponding attribution map.

In some embodiments, a model trained using the training techniques described herein is used to perform weakly supervised object localization and/or segmentation. For example, the disclosed systems and methods include receiving an input digital image comprising representations of one or more objects, determining an attribution map for the input digital image using an image classification neural network trained by minimizing a combination of a classification loss and an alignment loss on perturbed training images to learn alignment between training images and corresponding training image attribution maps, and performing object localization or image segmentation on the input digital image based on the attribution map for the input digital image. Because the attribution maps are more closely aligned with the input image than in prior techniques, the resulting segmentation masks or bounding boxes more accurately reflect the input image.

Additional features and advantages of exemplary embodiments of the present disclosure are set forth in the description which follows, and in part are obvious from the description, or are learned by the practice of such exemplary embodiments.

BRIEF DESCRIPTION OF THE DRAWINGS

The detailed description is described with reference to the accompanying drawings in which.

DETAILED DESCRIPTION

Figure 1:
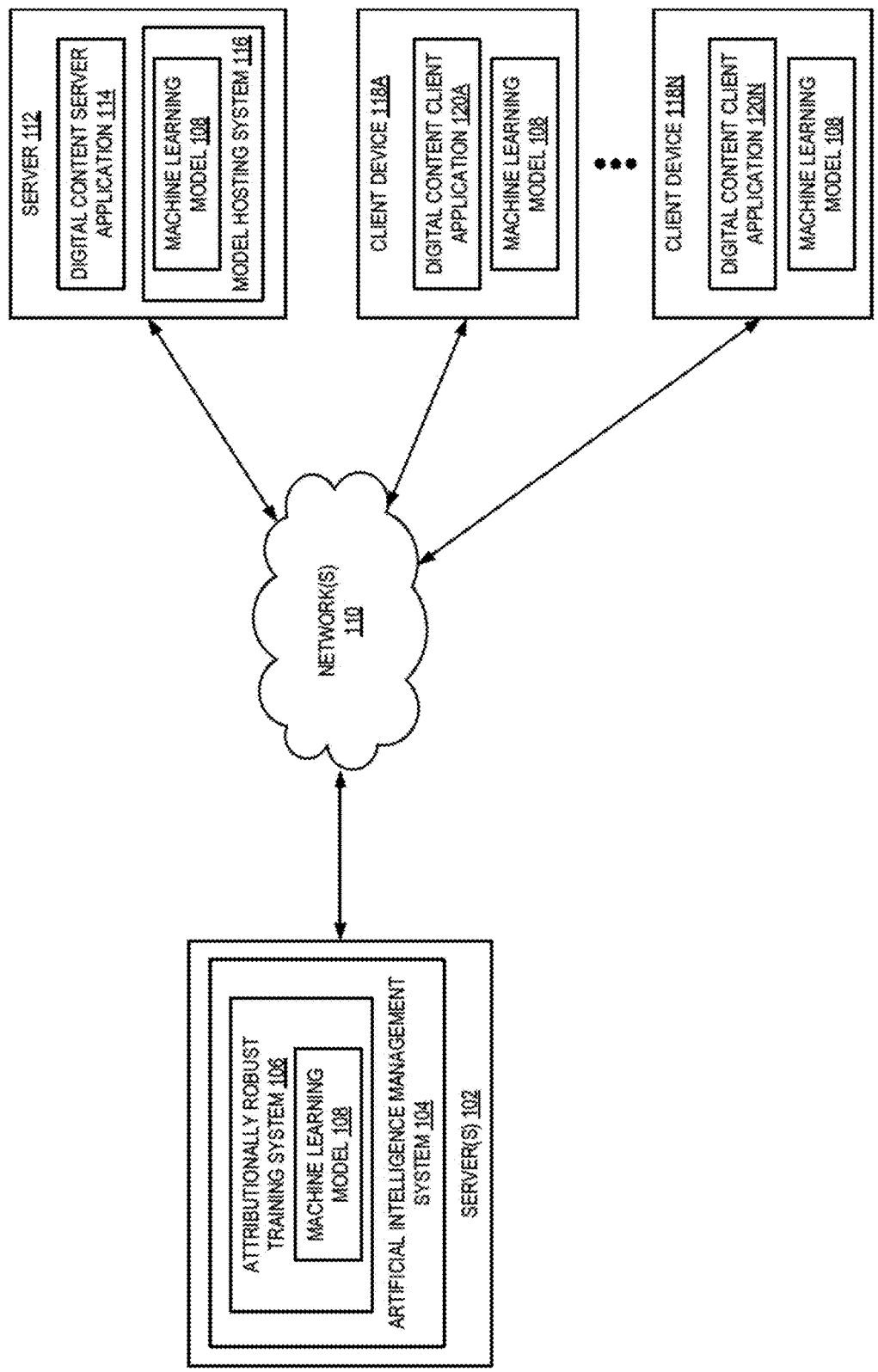
FIG. 1 illustrates a diagram of an environment for attributionally robust training of a machine learning model and deployment of the machine learning model in accordance with one or more embodiments.

One or more embodiments of the present disclosure include an artificial intelligence management system that trains improved machine learning models using attributionally robust training techniques. Weakly supervised object localization tasks aim to identify a location of an object in an image using only class label information and no bounding box location annotations. As obtaining location annotations is expensive and difficult to scale for consumption in deep learning models, algorithms for weakly supervised object localization are crucial in learning generalizable models for localization tasks. Similarly, weakly supervised image segmentation is an important vision task for which collecting training data annotations is time-consuming and costly. Therefore, recent work in weakly supervised segmentation are focusing on training models using weaker annotations like image labels instead of ground-truth segmentation masks. Embodiments enable machine learning models to be trained which more closely align their attribution maps with the objects represented in images. These attribution maps are used as a prior in performing improved weakly supervised localization and segmentation tasks on image datasets.

For example, a machine learning model is trained as an image classifier to identify representations of a plurality of different classes of objects in image data. The machine learning model is trained or tuned using labeled training data. Embodiments train the machine learning model in a manner which promotes alignment between an image and a corresponding gradient-based attribution map to improve the attribution map of the model. In some embodiments, the model is trained by first adversarially calculating a perturbed image which minimizes the alignment and then reducing both classification and alignment loss on the perturbed image. For example, a training image is passed through the machine learning model and attribution maps corresponding to the labeled class and the next highest probability class are extracted from the logits layer of the machine learning model. The training image, attribution map for the labeled class, and the attribution for the next highest probability class are passed through a triplet loss function. The triplet loss function is maximized to generate a perturbed training image corresponding to the training image. The perturbed training image is then used to further train or tune the machine learning model by minimizing a combination of classification loss and triplet loss. This it iteratively performed across the entire training data set over a plurality of training epochs until the machine learning model has been trained. The resulting trained model has learned to produce improved attribution maps on input images which more closely align with the object being detected by the machine learning model. These attributions maps provide improved results when used with weakly supervised object localization and segmentation techniques.

For example, conventional techniques rely on image classifiers which are not trained to align their attribution maps with the objects being classified. As such, the attribution maps, which represent the importance of portions of an image to the classification decision, do not reliably align with the location of the object in the image. For example, a classifier trained to identify different species of birds may focus on particular features, such as beaks. As a result, when a bounding box is fit to the attribution map, it often fails to capture a significant portion of the object being identified. Embodiments trained using the ART techniques described herein achieve improved localization accuracy in situations where one does not have access to labeled segmentation/bounding box information. This improved performance is achieved while requiring less training data and a smaller memory footprint.

Term Definitions

As used herein, the term "image" or "digital image" refers to a digital graphics file that when rendered displays one or more objects. In particular, the term "image" can comprise a digital file that includes representations of one or more objects. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device.

The term "machine learning," as used herein, refers to the process of constructing and implementing algorithms that learn from and make predictions on data. In general, machine learning operates by building models from example inputs (e.g., training), such as a training image data set, to make data-driven predictions or decisions. In some example embodiments, machine learning is used for classification, object localization, object segmentation, or other tasks.

As used herein, the term "neural network" refers to a machine learning model that is tuned (e.g., trained) based on inputs to approximate unknown functions. In particular, the term neural network includes a model of interconnected neurons that communicate and learn to approximate complex functions and generate outputs based on a plurality of inputs provided to the model. For instance, the term neural network includes one or more machine learning algorithms. In particular, the term neural network includes deep convolutional neural networks (i.e., "CNNs"). In addition, a neural network is an algorithm (or set of algorithms) that implements deep learning techniques that utilize a set of algorithms to model high-level abstractions in data.

As used herein the terms "attribution map," "pixel-attribution map," and "saliency map" refer to a depiction of which portions of an input image have the most impact on the classification decision made by the machine learning model. For example, an attribution map is extracted from a classifier that is analyzing an input image to classify an object depicted therein. One way of depicting an attribution map is as a heatmap, where each pixel is given a heat value based on the importance of that pixel to the decision made by the machine learning model. In the resulting heatmap, "hotter" areas represent areas of more importance and "cooler" areas represent areas of lesser importance.

As used herein, the term "loss function" or "loss model" refers to a function that indicates loss errors between feature vectors and/or probability vectors in multi-dimensional vector space. A machine-learning algorithm (e.g., neural network) repetitively trains to minimize and/or maximize error loss. In some embodiments, multiple loss functions are used to train a machine learning model. For example, as discussed further below, a triplet loss function is used to generate a portion of training data by maximizing the first loss function and then the machine learning model is trained to minimize a second loss function.

As used herein, the term "training data" refers to information used to train a machine learning model to perform a particular task. For example, training data includes a set of training images and a corresponding set of labels. The labels include ground truth labels for the training images. For example, a set of training images with corresponding class labels are used to train a classifier to identify representations of objects belonging to one or more classes. The term "ground-truth label" refers to empirically observed data or data obtained from a trusted labeler which is utilized as a reference to train or tune a machine learning model.

As used herein, the term "perturbed training data" refers to a second set of training data that has been generated by modifying or changing (e.g., perturbing) a first set of training data. For example, as discussed further below, training data is passed through a classifier and perturbed by maximizing a triplet loss function. The resulting perturbed training data is used to train a classifier is trained using attributionally robust training techniques to align attributions maps more closely with the object in an image being classified.

As used herein, the term "object localization" refers to techniques to locate the presence of an object in an image and annotate the image with the bounding box around the object's location. In some embodiments, the class of a located object is also identified. For example, object localization is performed on an input image and outputs one or more bounding boxes (or coordinates of the bounding boxes) that identify the location(s) of objects identified in the input image.

As used herein, the term "image segmentation" refers to a process of partitioning a digital image into multiple segments (sets of pixels, also known as image objects). For example, image segmentation is used to generate a segmentation mask, also referred to as an "object segmentation mask," "object mask," or simply "mask," which includes data (e.g., a file or layer) that isolates one or more objects of interest in an image from other portions of the image.

FIG. 1 illustrates a diagram of an environment for attributionally robust training of a machine learning model and deployment of the machine learning model in accordance with one or more embodiments. As illustrated in FIG. 1, the environment 100 includes server(s) 102; client devices 118A-118N; and one or more networks 110, such as the Internet. The client devices 118A-118N include, but are not limited to, mobile devices (e.g., smartphones, tablets), laptops, desktops, or any other type of computing device, such as those described below with respect to FIG. 11. Similarly, the network 110 comprises any of the networks described below in relation to FIG. 11.

As shown in FIG. 1, the server(s) 102 host an artificial intelligence management system 104, which includes attributionally robust training system 106 and a machine learning model 108. Both the artificial intelligence management system 104 and the machine learning model 108 take a variety of forms and perform a variety of tasks. For example, in some embodiments, the artificial intelligence management system 104 uses the machine learning model 108 to analyze, modify, manage, and perform tasks for digital image data, digital video data, or digital text data. Based on user input from one of the client devices 118A-118N, for instance, the artificial intelligence management system 104 analyzes, organizes, or modifies digital images, such as by identifying objects portrayed in digital image or video data, localizing objects portrayed in digital image or video data, segmenting objects in digital image or video data, etc.

As further illustrated in FIG. 1, the client devices 118A-118N communicate through the network 110 with the artificial intelligence management system 104 and the attributionally robust training system 106 via the server(s) 102. Accordingly, a user associated with one of the client devices 118A-118N accesses one or more digital images, digital videos, software applications, or other digital content provided (in whole or in part) by the artificial intelligence management system 104, including to download a native application. Additionally, in some embodiments, third party server(s) (not shown) provide data to the server(s) 102 that enable the artificial intelligence management system 104 or the attributionally robust training system 106 to access, download, or upload digital images, digital videos, software applications, or other digital content via the server(s) 102.

As indicated in FIG. 1, the client devices 118A-118N respectively include digital content applications 120A-120N. The digital content applications 120A-120N take a variety of forms, such as native applications or web browsers that access websites for designing digital illustrations, generating audio, presenting multimedia content, animating digital characters, or presenting or editing digital documents. To access the artificial intelligence management system 104, in certain embodiments, a user interacts with one of the digital content applications 120A-120N on the client devices 118A-118N. As suggested above, in some embodiments, the digital content applications 120A-120N comprise web browsers, applets, or other software applications (e.g., native applications) available to the client devices 118A-118N. Additionally, in some instances, the digital content applications 120A-120N are integrated within applications or webpages.

In some embodiments, artificial intelligence management system 104 and attributionally robust training system 106 trains a machine learning model using techniques described herein. Once the machine learning model 108 has been trained it is deployed to a different server 112 to a model hosting system 116. The model hosting system 116 is configured to host one or more models that are utilized by digital content server application 114 to process requests to perform machine learning tasks received from the one or more client devices 118A-118N. Different models hosted by the model hosting system is trained to perform different machine learning tasks. For example, machine learning tasks include identifying objects portrayed in digital image or video data, localizing objects portrayed in digital image or video data, segmenting objects in digital image or video data, etc.

In some embodiments, the digital content server application 114 provides the machine learning tasks as a service, where the digital content server application 114 serves as a front-end interface to the machine learning model 108 and any other machine learning models hosted by the model hosting system 116. For example, a user of one of the client devices requires localization and/or segmentation algorithms for use with, or in support of, other client applications. Rather than training and hosting their own models to perform these tasks, the user accesses the tasks as provided by the digital content server application 114. A digital content server application 114 includes some or all of the functionality of the digital content client applications 120A-120N and accesses the machine learning model 108 in model hosting system 116 to serve requests received from one or more client devices 118A-118N. For example, the digital content client applications 120A-120N of the one or more client devices 118A-118N send a request to digital content server application 114 to perform one or more machine learning tasks on data provided by the one or more client devices 118A-118N.

Although FIG. 1 illustrates the attributionally robust training system 106 implemented as part of the server(s) 102, in some embodiments the attributionally robust training system 106 is implemented (e.g., performs acts or processes) via the client device(s) 118A-118N. For example, a given client device implements an attributionally robust training system and trains the machine learning model 108 locally using training data available to the client device (e.g., local training data or training data accessible over a local area network, wide area network, the Internet, etc.).

While FIG. 1 depicts only a few client devices, in alternative embodiments, the environment 100 includes more than one of both of the client devices 118A-118N and their respective users. The environment 100 includes any number of client devices. For example, in some embodiments, the environment 100 includes hundreds, thousands, millions, or billions of users and corresponding client devices. Moreover, although FIG. 1 illustrates a particular arrangement for the server(s) 102, server 112, client devices 118A-118N, and the network(s) 110, various additional arrangements are possible. For example, the client devices 118A-118N directly communicate with server(s) 102 or server 112 and thereby bypass the network 110.

Figure 2:
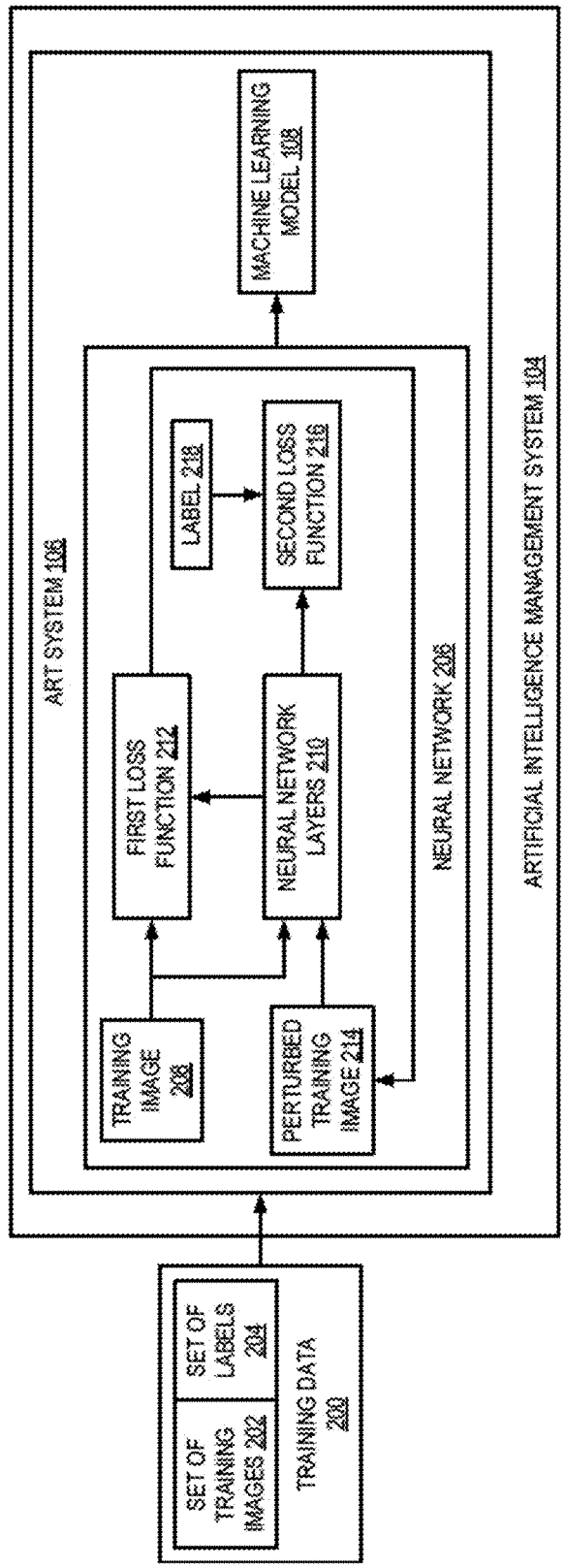
FIG. 2 illustrates a diagram of a process of performing attributionally robust training of a machine learning model in accordance with one or more embodiments.

FIG. 2 illustrates a diagram of a process of performing attributionally robust training of a machine learning model in accordance with one or more embodiments. As shown in FIG. 2, an artificial intelligence management system 104 receives training data 200. The training data includes a set of training images 202 and a corresponding set of labels 204. The labels include ground truth labels for the training images. For example, the labels 204 include, for each training image 202, a bounding box around the object depicted in the training image. In some embodiments, the labels further include class labels or other label data associated with the training images. The term "ground-truth label" refers to empirically observed data or data obtained from a trusted labeler which is utilized as a reference to train or tune a machine learning model.

The artificial intelligence management system 104 includes an attributionally robust training system 106. The attributionally robust training system 106 is used to train a neural network 206 to perform classification tasks on input image data (also referred to herein as a "classifier"). Once trained, the resulting machine learning model 108 receives an input image with representations of unknown objects and classify the objects depicted therein into one or more classes which the machine learning model has been trained to identify. The basic motivation behind weakly supervised object localization is that a classifier with good classification accuracy should also be able to identify the region of the input image that includes the depiction of the identified object.

An attribution map is extracted from a classifier that is analyzing an input image to identify an object depicted therein. As used herein an "attribution map," "pixel-attribution map," and "saliency map" refer to a depiction of which portions of an input image have the most impact on the classification decision made by the machine learning model 108. This is depicted as a heatmap where each pixel is associated with a "hotness" value corresponding to the impact that pixel had on the final decision. For example, regions of high impact are white while regions of low impact are black with various gradations in between. Prior techniques have used the attribution map for localization. However, classifiers rely on only a small portion of an object to identify that object. For example, some classifiers identifying a bird rely primarily on the portion of the image that depicts its beak. As such, a significant limitation of existing techniques which use attribution maps for localization or segmentation is the failure of the attribution map to align with the object depicted in the image data. This leads to inaccurate localization and segmentation as these tasks are relying on an attribution map that does not accurately correspond to the depicted object.

As shown in FIG. 2, an input training image 208 is passed to both a first loss function 212 and neural network layers 210. The neural network layers 210 analyze the training image 208. As discussed further below with respect to FIG. 3, the neural network layers 210 include various layers such as convolutional layers and pooling layers. The higher-level layers (e.g., the logit layer) are used to obtain attribution maps corresponding to different classes. Embodiments extract the attribution map from the class with the highest probability and the attribution map from the class with the highest probability that is not the ground truth class and pass those attribution maps to the first loss function 212. For example, an image is classified using a classifier that has been trained to identify ten classes. If the ground truth class is class 2, then the attribution map for class 2 is extracted, and the attribution map for the class having the highest probability which is not class 2 is extracted. As used herein, the term "loss function" or "loss model" refers to a function that indicates loss errors between feature vectors and/or probability vectors in multi-dimensional vector space. A machine-learning algorithm (e.g., neural network) repetitively trains to minimize and/or maximize error loss. The first loss function is a triplet loss function which receives the training image (e.g., the anchor), the attribution map from the class with the highest probability (e.g., the positive), and the attribution map from the class with the highest probability that is not the ground truth class (e.g., the negative) and output an attribution loss value. Perturbed training image 214 is calculated by maximizing the first loss function 212.

The perturbed training image 214 is then used to train the neural network. For example, the perturbed training image is passed through the neural network layers 210 and the output is compared to the label 218 corresponding to the training image 208 to calculate a second loss function 216. The training is performed to minimize a combination of the first loss function 212 and the second loss function 216 calculated for the perturbed image. This is performed across the entire training data set 200 for a number of epochs (e.g., complete iterations through the entire training data set 200) until the machine learning model 108 has been trained. Machine learning model 108 is a representation of the trained neural network (e.g., as a set of weights and/or parameters). Once trained, the model receives an input image and output a classification for one or more objects depicted in the input image. Additionally, the attribution map is also extracted and used to perform object localization and/or segmentation.

Figure 3:
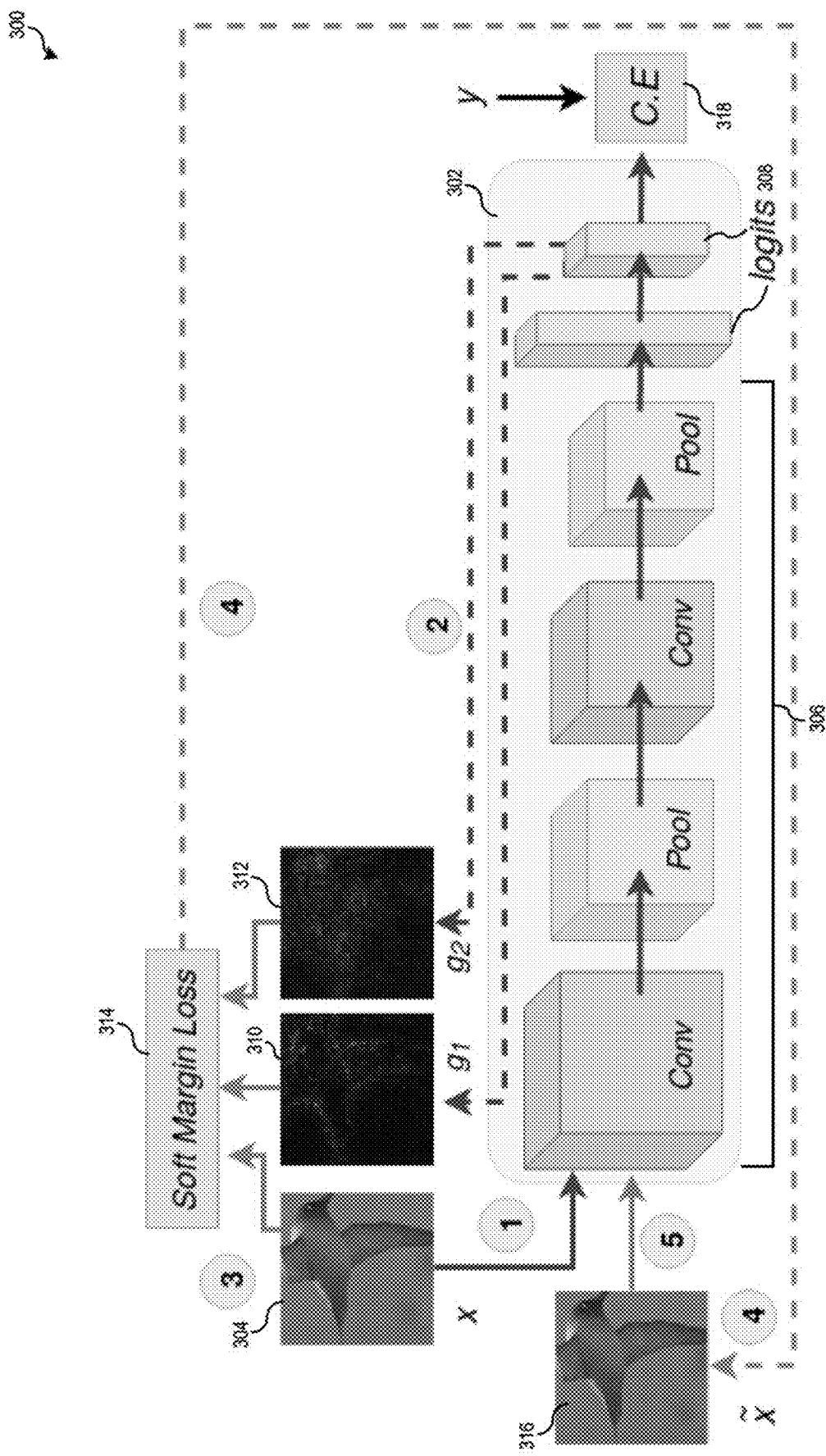
FIG. 3 illustrates a diagram of a machine learning architecture 300 for performing attributionally robust training of a machine learning model in accordance with one or more embodiments.

FIG. 3 illustrates a diagram of a machine learning architecture 300 for performing attributionally robust training of a machine learning model in accordance with one or more embodiments. As shown in FIG. 3, a neural network 302, $f_\theta$: $\mathbb{R}^n \to \mathbb{R}^k$, includes rectified linear units (ReLUs) implementing activation functions which classifies an input image x 304∈[0,1]$^n$ into k classes with true label y∈{1 ... k}. The neural network 302 includes a plurality of layers including lower level layers 306 and logits 308. The lower level layers 306 include a plurality of convolutional layers and pooling layers. In some embodiments, the neural network includes a plurality of logits equal to the number of classes which the neural network is trained to identify. The logit value corresponding to class i∈{1 ... k} is denoted as $f(x)_i$. For a given class i, the corresponding attribution map is referred as I(x, $f(x)_i$) that assigns an importance score to each input pixel of x 304 based on its relevance for predicting the class i.

For example, input image x 304 is input to neural network 302 as shown at numeral 1. In the example of FIG. 3, input image x 304 depicts a gull and is associated with a label of "gull," "bird," etc. depending on the classes which the neural network is being trained to identify. Given an input image x 304∈$\mathbb{R}^n$ and its label y, the attribution map with respect to output logit i∈{1 ... k} is calculated via the gradient of the logit value i (e.g., $\nabla_x f(x)_i$). For conciseness, $g_i(x)$ is used herein to denote $\nabla_x f(x)_i$. The neural network is trained to make $g_y(x)$ and the classification loss landscape invariant in the local neighborhood of x by optimizing the following objective:

$$\underset{\theta}{\text{minimize}}\ \underset{(x,y)}{E}\left[L_{ce}(x+\delta, y) + \underset{\delta \in B_\varepsilon}{\max}\ L_{attr}(g_y(x+\delta))\right]$$

where $L_{ce}$ is the cross entropy loss (e.g., classification loss) and $L_{attr}$ is the attribution loss which encourages the alignment of the attribution map $g_y(x)$ with x. Here, $L_{attr}$ is the attribution loss which promotes similar images to possess similar attribution maps. For example, as shown in FIG. 3, the logits layer 308 of neural network 302 includes a plurality of logits corresponding to the different classes which the neural network 302 is trained to identify. Each logit outputs a value that is used to determine which class has the highest probability of being depicted in the input image 304. As discussed, the attribution map is calculated based on the gradient of the logits and two attribution maps, $g_1$ 310 and $g_2$ 312, are extracted as shown at numeral 2. In some embodiments, $g_1$ corresponds to the attribution map for the logit corresponding to the labeled class (e.g., the ground truth class) and $g_2$ corresponds to the logit having the highest probability that is not the ground truth class of being depicted in the input image 304. As shown in FIG. 3, $g_1$ more closely resembles the shape of the bird in the input image 304 than $g_2$.

$L_{attr}$ is defined as:

$$L_{attr}(x) = \log\left(1 + \exp\left(-(d_{neg} - d_{pos})\right)\right)$$

$$\text{where}\ d_{pos} = 1 - \cos\left(g_y(x), x\right)$$

$$d_{neg} = 1 - \cos\left(g_{j^*}(x), x\right)$$

$$j^* = \underset{j \neq y}{\arg\max}\ f(x)_j$$

In some embodiments, $L_{attr}$ is a soft-margin triplet loss with anchor x 304, its positive instance $g_y(x)$ (e.g., $g_1$ in FIG. 3) and its negative instance $g_j(x)$ (e.g., $g_2$ in FIG. 3). At numeral 3, the input image 304 (e.g., the anchor), the positive instance $g_1$, and the negative instance $g_2$, are provided to a soft margin triplet loss function. The idea being that attribution map calculation with respect to different class logit value should be different and $g_y(x)$, which corresponds to the labeled class of the input image, should have the largest perceptual similarity with the image x.

A perturbed image $\tilde{x} = x + \delta$ is calculated to maximize the soft-margin triplet loss function 314, $L_{attr}$, by using iterative projected gradient descent, as shown at numeral 4. The resulting perturbed image 316, $\tilde{x}$, is then passed to the neural network 302, as shown at numeral 5, and is used as the new training point on which $L_{ce}$ and $L_{attr}$ is minimized. This min-max formulation is different from adversarial training as only $L_{attr}$ is maximized to calculate the perturbation delta.

The optimization of $L_{attr}$ involves computing gradient of $g_i(x)$ with respect to input x which suffers from the problem of vanishing second derivative in case of ReLU activations, i.e.

$$\frac{\partial^2 f_i}{\partial x^2} \approx 0.$$

To alleviate this, while optimizing $L_{attr}$, ReLU is replaced with softplus non-linearities, as it has a well-defined second derivative. The softplus approximates to ReLU as the value of β increases:

$$\text{softplus}_\beta(x) = \frac{\log\left(1 + e^{\beta x}\right)}{\beta}$$

Pseudo-code for the above described training methodology is shown below. Note that in various embodiments other attribution methods are alternatively used (e.g. Integrated gradient) in the formulation of $L_{attr}$.

```
begin
|   Input: Training Data X = {(x₁, y₁)...(xₙ, yₙ)}, batch size b,
|       number of epochs E, learning rate lr, number of attack steps a,
|       step-size for iterative perturbation α
|   Output: f_θ
|   Initialize variables θ
|   for epoch ∈ {1, 2, ..., E} do
|   |   Get mini-batch x,y = {(x₁, y₁)...(x_b, y_b)}
|   |   x̃ = x + Uniform[-ε, +ε]
|   |   for i=1,2, ... , a do
|   |   |   x̃ = x̃ + α * sign(∇_x L_attr(x̃, y))
|   |   |   x̃ = Proj_{j∞} (x̃)
|   |   end
|   |   i* = ground truth index
|   |   j* = arg max logit_j
```

-continued

```
|     |    j≠i
|     |    Calculate g1 = ∇_x(f(x̃)_{i*})
|     |    Calculate g2 = ∇_x(f(x̃)_{j*})
|     |    loss = L_ce(x̃, y) + λ * L_attr(x̃)
|     |    Update θ using (loss)
|     end
|     return f_θ.
end
```

Figure 4:
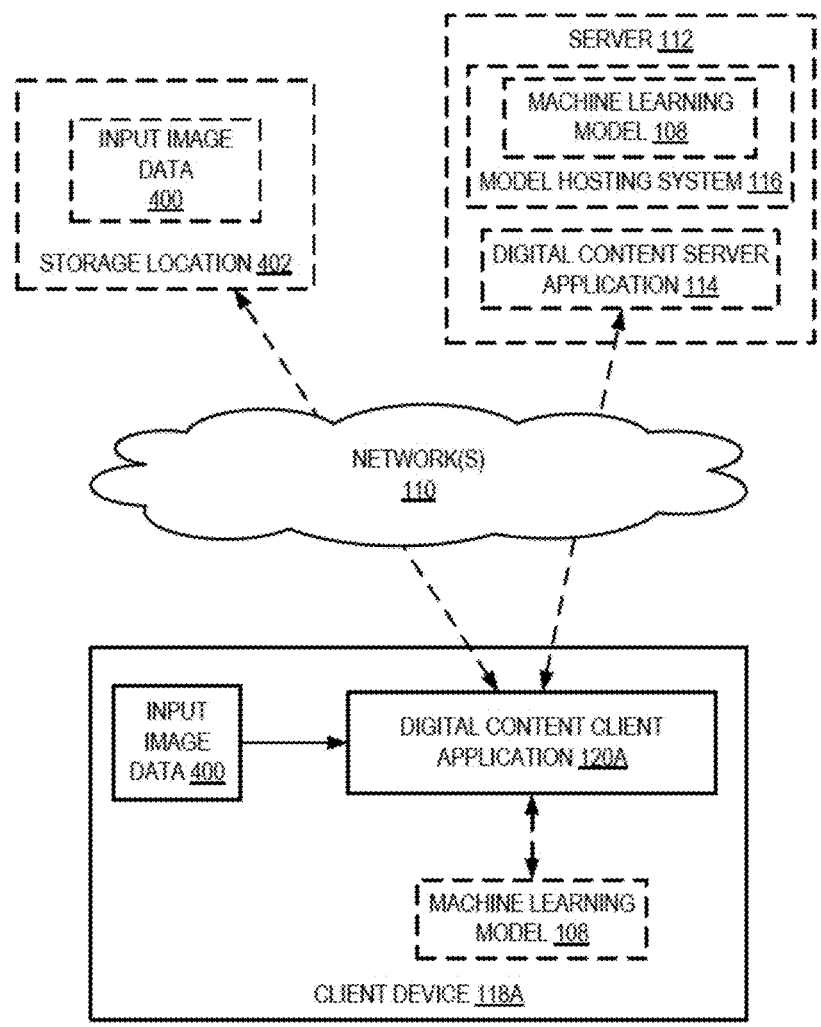
FIG. 4 illustrates an example of an environment for performing image classification using a machine learning model trained using attributionally robust training techniques, in accordance with an embodiment.

FIG. 4 illustrates an example of an environment for performing image classification using a machine learning model trained using attributionally robust training techniques, in accordance with an embodiment. As shown in FIG. 4, a machine learning model trained using the above described ART system is used with a variety of digital content applications. For example, a user provides an input image 400 to a digital content client application 120A. As shown in FIG. 4, the user has a local copy of the input image 400 or accesses the input image from a storage location 402 that is accessible over one or more networks 110. For example, in some embodiments, the input image is stored on a network-attached storage device, a local database or other storage location, or the input image is stored in a storage service, such as a database service, block storage service, object storage service, or other storage service offered by a service provider and accessible over network 110, such as the Internet.

The digital content client application 120A provides the input image 400 to a machine learning model 108 trained using the ART system described above to obtain metadata for the image. For example, the metadata includes estimated bounding box locations around objects depicted in the input image, segmentation masks for the input image, etc. This metadata is obtained using weakly supervised object localization techniques or weakly supervised image segmentation techniques using the attribution maps extracted from the machine learning model 108 trained using the ART system described above. For example, when the machine learning model 108 analyzes an input image, it returns a classification of an object depicted in the image. An attribution map, such as a gradient attribution map, is extracted from the logit of the highest probability class and used to estimate a bounding box or segmentation mask using weakly supervised object localization or image segmentation techniques. For example, a bounding box is fit on the largest connected region in the attribution map with values above a specific threshold. Similarly, a segmentation mask is estimated, for example, by segmenting portions of the image having a high saliency (e.g., above a threshold value) from portions of the image having low saliency, using known techniques. Similarly, the digital content client application 120A is used with digital videos. For example, in some embodiments, the input image data 400 includes a digital video. Frames of the digital video are analyzed using the machine learning model 108 to obtain metadata about the video. This metadata is used to perform object tracking of objects depicted across a plurality of frames of the digital video.

As shown in FIG. 4, the machine learning model 108 is stored locally on the client device with the digital content client application 120A and the digital content client application communicates with the machine learning model locally on the same client device. Additionally, or alternatively, the digital content client application communicates with a digital content server application 114 on server 112 to access a remote machine learning model 108 hosted by a model hosting system 116. For example, the digital content client application 120A provides the input image data 400 to the digital content server application 114 which then provides the input image data 400 to the machine learning model to obtain metadata for the input image data 400. The metadata is then returned to the digital content client application 120A for further processing, editing, etc. by the user.

Figure 5:
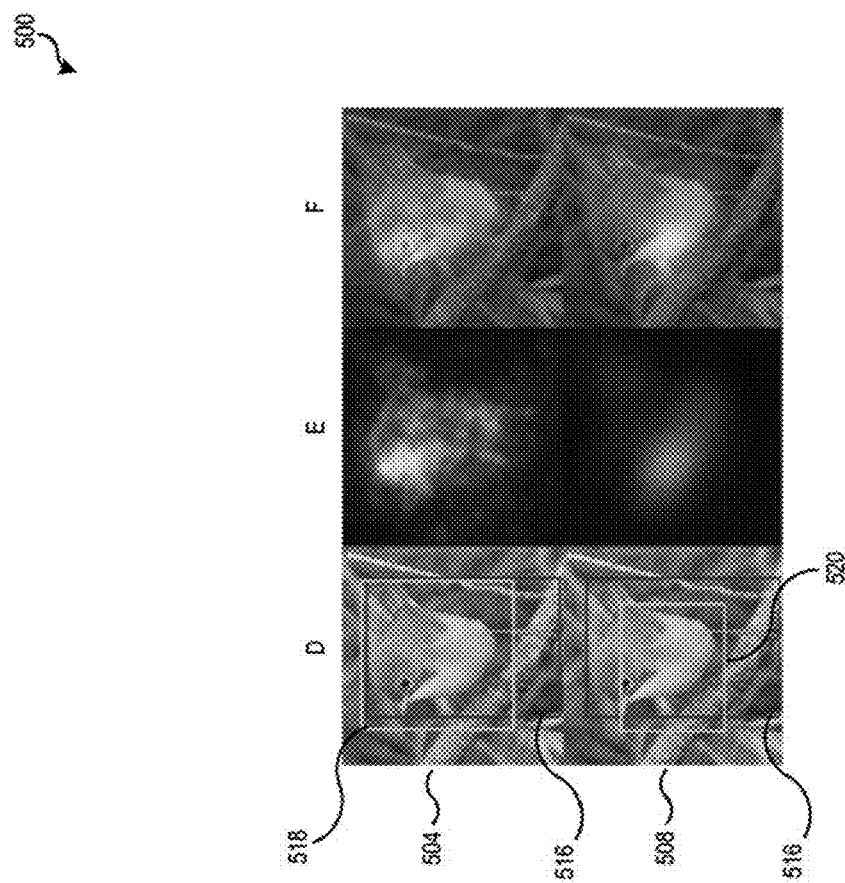
FIG. 5 illustrates a comparison of experimental results of image localization using a machine learning model trained using attributionally robust training techniques in accordance with one or more embodiments.
Figure 5:
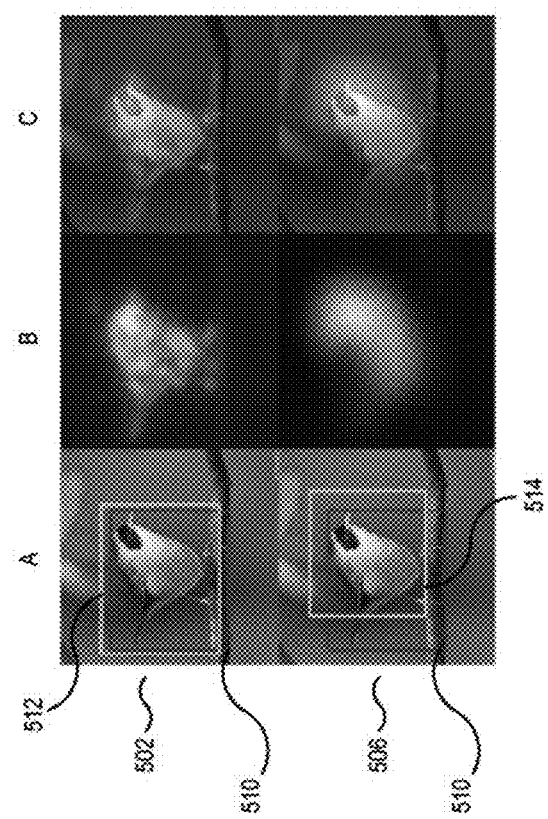

FIG. 5 illustrates a comparison of experimental results 500 of image localization using a machine learning model trained using attributionally robust training techniques in accordance with one or more embodiments. As discussed, weakly supervised object localization relies on an attribution (e.g., saliency) map obtained from a classification model to estimate a bounding box for identified objects in a digital image. The example of FIG. 5 illustrates experimental results comparing a model trained using embodiments of the training system described above against the current state of the art model (e.g., an attention-based dropout layer (ADL) trained model) on the Caltech-UCSD Birds 200 (CUB) dataset. Additionally, the results of the ART model, the ADL model, and a PGD-7 trained model which was adversarially trained using a seven step PGD-attack, are shown in the table below.

CUB is an image dataset of 200 different bird species (mostly North American) with 11,788 images in total out of which 5794 images are in test-set. Each image is annotated with a bounding box, rough bird segmentation, and attribute labels about the depicted bird. Both a ResNet-50 and VGG model were pretrained on ImageNet for all approaches and then fine-tuned using ART, ADL, and PGD-7 for comparison purposes.

For the natural training method, a stochastic gradient descent (SGD) optimizer with an initial learning rate of 0.01, momentum of 0.9 and $l_2$ weight decay of 1e-4 was used. The model was trained for 200 epochs with learning rate decay of 0:1 at every 60 epochs. For the PGD-7 training method, the same hyper-parameters as natural training were used with ε=2/255 and step_size=0.5=255 for calculating adversarial examples. For the ART training, an SGD optimizer was used with an initial learning rate of 0.01, momentum of 0.9 and $l_2$ weight decay of 2e-4. The learning rate was decayed by 0.1 at every 40 epochs until 200 epochs. Calculating $L_{attr}$ loss used mean over channels followed by average pool over a 3*3 kernel for both images and gradients. Values of other hyper-parameters are ε=2/255, step_size=1.5/255, a=3, λ=0.5 and β=50.

A similar approach as ADL was used for extracting bounding boxes except that the gradient attribution map $\nabla_x f(x)_y$ was used instead of class activation mapping (CAM). As a post-processing step, a heatmap representation of the attribution map was created by converting the attribution map to grayscale, normalizing the attribution map, and then applying a mean filtering of 3*3 kernel over it. Then a bounding box was fit over the resulting heatmap to localize the object. Experiments were performed on Resnet-50 and VGG architectures and the results are shown below.

| | | Saliency Method | | |
| --- | --- | --- | --- | --- |
| Model | Method | GT-Known Loc | Top-1 Loc | Top-1 Acc |
| ResNet50-SE | ADL | — | 62.29 | 80.34 |
| ResNet50 | Natural | 60.37 | 50.0 | 81.12 |
| | PGD-7 | 69.93 | 50.10 | 70.02 |
| | ADL | 56.85 | 47.53 | 80.0 |
| | ART (Ours) | 82.65 | 65.22 | 77.58 |
| VGG-GAP | Natural | 48.75 | 35.03 | 72.938 |

-continued

| Model | Method | Saliency Method | | |
| --- | --- | --- | --- | --- |
| | | GT-Known Loc | Top-1 Loc | Top-1 Acc |
| | ACoL | — | 45.92 | 71.90 |
| | ADL | 69.36 | 50.88 | 70.31 |
| | ART (Ours) | 75.40 | 57.04 | 74.51 |

Accuracy of each model was evaluated using top-1 classification accuracy (Top-1 Acc); Localization accuracy when ground truth is known (GT-Known Loc), i.e. when intersection over union (IoU) of estimated box and ground truth bounding box>0.5; and Top-1 localization accuracy, i.e. when prediction is correct and IoU of bounding box>0.5 (Top-1 Loc). As shown in the table above, models trained with the ART approach described herein results in highest GT-Known Loc and Top-1 Loc for both Resnet-50 and VGG-GAP model with gradient saliency method.

A comparison of the bounding boxes produced is shown in FIG. 5. As shown in FIG. 5, the top row 502, 504 corresponds to the results of the bounding box produced using the VGG model trained using the ART system described above, and the bottom row 506, 508 corresponds to a VGG model trained using ADL. As shown in Column A, the ground truth bounding box 512 is very closely aligned with the bounding box 512 produced by a model trained using ART whereas the bounding box 514 produced by the model trained using ADL is significantly less aligned. Likewise, the heatmap shown in column B show that ART produced an attribution map that is clearly aligned with the image of the bird, as further shown in the overlay of column C. Similar examples are shown in columns D, E, and F, with ground truth bounding box 516, ART identified bounding box 518, and less accurate ADL bounding box 520.

Figure 6:
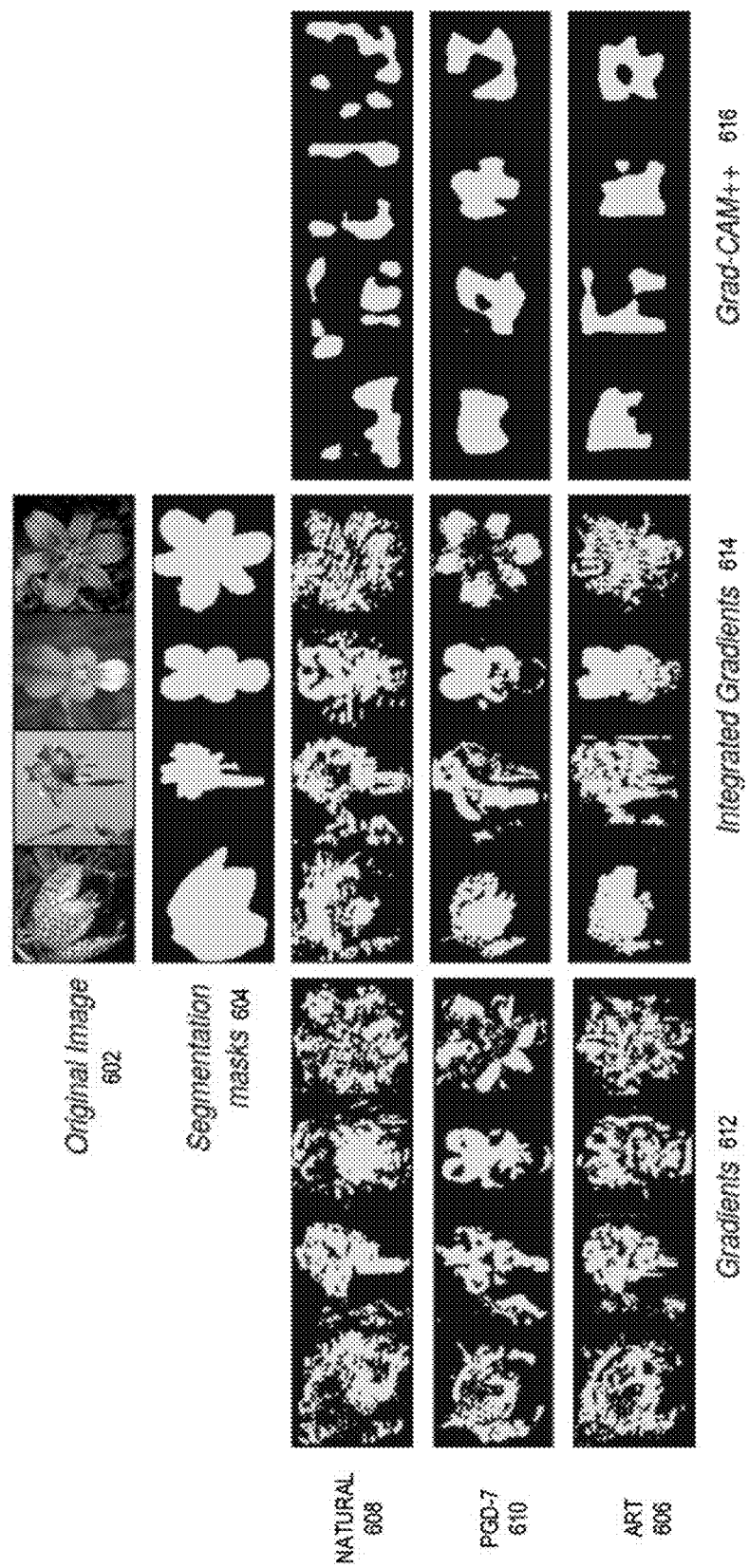
FIG. 6 illustrates a comparison of experimental results of image segmentation using a machine learning model trained using attributionally robust training techniques in accordance with one or more embodiments.

FIG. 6 illustrates a comparison of experimental results 600 of image segmentation using a machine learning model trained using attributionally robust training techniques in accordance with one or more embodiments. Image segmentation is an important vision task for which collecting training data annotations easily proves to be time-consuming and costly. As discussed, weakly supervised segmentation is based on performing segmentation using models trained using weaker annotations like image labels instead of ground-truth segmentation masks. Original images shown at 602 were processed using models trained via ART as described above and a segmentation mask was generated based on the attribution masks produced by the trained model. In FIG. 6, these results are compared to segmentation masks generated using models trained via other techniques and to the ground truth segmentation masks 604.

Experiments were performed on a flower dataset which included ground-truth segmentation masks 604 of 849 images. Results were evaluated using Top-1 Seg metric which is analogous to the Top-1 Loc metric used in weakly supervised localization described above. Top-1 Seg considers an answer as correct when the model prediction is correct and the intersection over union (IoU) of ground-truth mask and estimated mask is at least 50%. As shown in FIG. 6, ART 606 is compared against a naturally trained model 608 and a PGD-7 trained model 610 using three different saliency methods: gradients 612, Integrated Gradients 614 and GradCAM++616. Results are also shown in the table below. Saliency maps are converted into grayscale heatmaps and a smoothing filter is applied as a post-processing step. Example images of weakly-supervised segmentation masks generated by above models and explanation methods are shown in FIG. 6. As shown below, the ART trained model generally outperforms the alternatives on different attribution techniques.

| | Saliency Method | | |
| --- | --- | --- | --- |
| Model | Grad | IntGrad | GradCAM++ |
| Natural | 0.2441 | 0.3372 | 0.0200 |
| PGD-7 | 0.2465 | 0.4222 | 0.1097 |
| ART (Ours) | 0.3172 | 0.6038 | 0.0849 |

Figure 7:
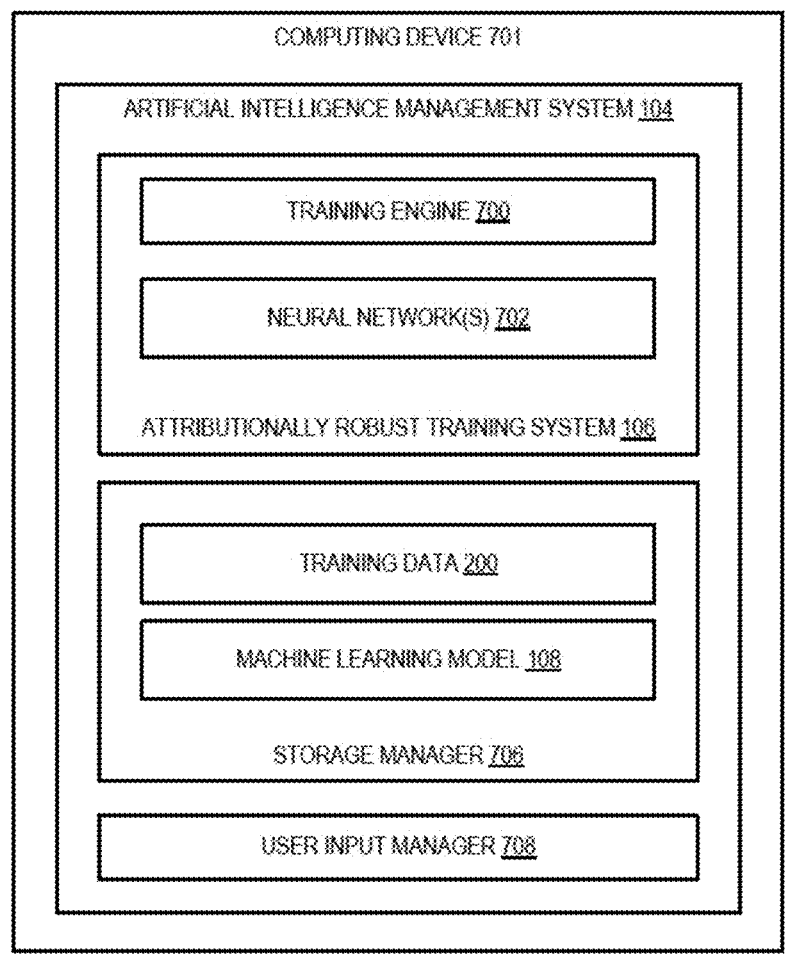
FIG. 7 illustrates a schematic diagram of an artificial intelligence management system in accordance with one or more embodiments.

FIG. 7 illustrates a schematic diagram of an artificial intelligence management system 104 (e.g., "artificial intelligence management system" described above) in accordance with one or more embodiments. As shown, the artificial intelligence management system 104 be implemented on one or more servers 102. Additionally, as discussed, in some embodiments all or a portion of the functionality of the artificial intelligence management system 104 is implemented on one or more client devices instead of, or in addition to, the one or more servers. As shown in FIG. 7, the artificial intelligence management system 104 includes, but is not limited to, an attributionally robust training (ART) system 106, which includes a training engine 700 and a neural network 702, and a storage manager 706, which includes training data 200 and a trained machine learning model 108.

As illustrated in FIG. 7, the artificial intelligence management system 104 includes the ART system 106 that includes the training engine 700. The training engine 700 teaches, guides, tunes, and/or trains one or more neural networks. In particular, the training engine 700 trains a neural network based on a plurality of training data (e.g., training data 200). As discussed, the training data include digital images and/or digital videos that include representations of one or more objects which the neural network is to be trained to identify. More specifically, the training engine 700 accesses, identifies, generates, creates, and/or determines training input and utilize the training input to train and fine-tune a neural network. For instance, the training engine 700 trains the neural network 702, as discussed above in detail with respect to FIGS. 2-3.

In addition, and as mentioned directly above, the ART system 106 manages the training and the use of various neural networks. In particular, the ART system 106 manages the training and utilization of one or more neural networks 702. The one or more neural networks includes one or all of the features and functions described above with respect to the neural network 206, neural network 302, and/or the neural networks used for experimentation of FIGS. 2, 3, 5, and 6. Moreover, in one or more embodiments other types of networks are trained using the ART system.

Figure 10:
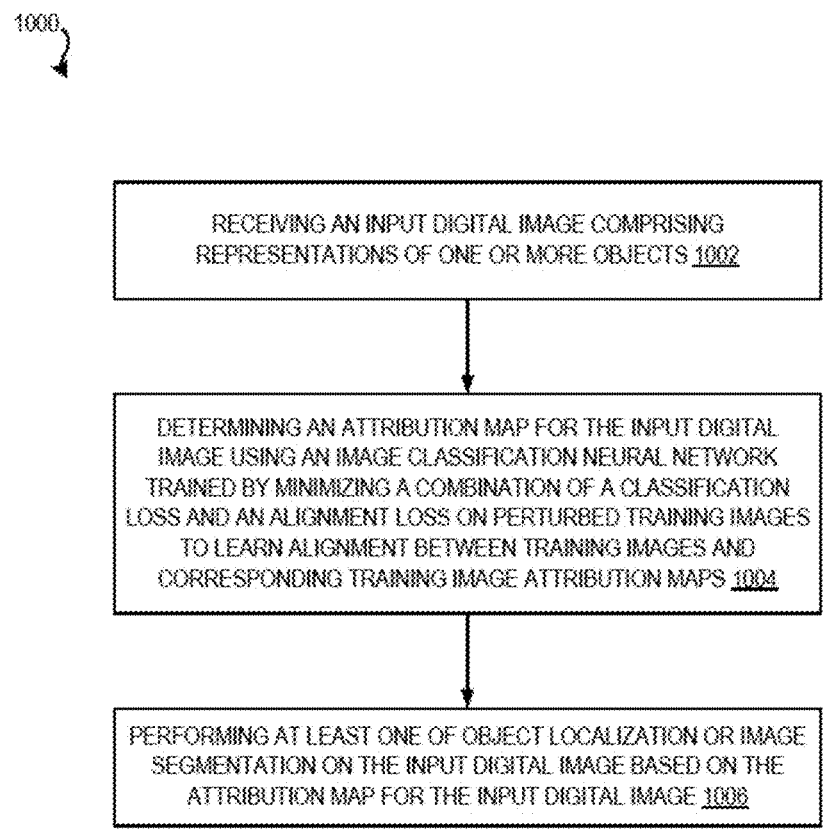
FIG. 10 illustrates a flowchart of a series of acts in a method of performing image classification using an attributionally robust trained machine learning model in accordance with one or more embodiments.

As illustrated in FIG. 10, the artificial intelligence management system 104 also includes the storage manager 706. The storage manager 706 maintains data for the artificial intelligence management system 104. The storage manager 706 maintains data of any type, size, or kind as necessary to perform the functions of the artificial intelligence management system 104. The storage manager 706, as shown in FIG. 10, includes the training data 200. The training data 200 includes a plurality of digital training images and/or digital training videos that depict objects a neural network is to be trained to identify, as discussed in additional detail above. In particular, in one or more embodiments, the training data 200 include digital training images utilized by the ART system 106 to train one or more neural networks to classify objects in the digital training images such that the attribution maps more closely align with the depiction of the objects, as described above.

As further illustrated in FIG. 7, the storage manager 706 also includes one or more trained machine learning models 108. The trained machine learning model(s) 108 includes a collection of weights and/or other parameters that were learned during the training applied by the ART system 106. The storage manager 706 interfaces with other systems, e.g., other client devices and/or storage devices, to provide the trained machine learning model(s) 108 to be used to perform classification tasks by other applications (e.g., digital content client and/or server applications, as described above). For example, the trained machine learning model(s) 108 is used to perform weakly supervised image segmentation based on the attribution maps generated by the trained machine learning model(s). Similarly, the trained machine learning model(s) 108 is used to perform weakly supervised object localization to identify bounding boxes around objects identified in one or more input images based on the attribution maps generated by the trained machine learning model(s).

Each of the components 106 and 700-706 of the artificial intelligence management system 104 and their corresponding elements (as shown in FIG. 7) are in communication with one another using any suitable communication technologies. It is recognized that although components 106 and 700-706 and their corresponding elements are shown to be separate in FIG. 7, any of components 106 and 700-706 and their corresponding elements are combined into fewer components, such as into a single facility or module, divided into more components, or configured into different components as serves a particular embodiment.

The components 106 and 700-706 and their corresponding elements in various embodiments comprise software, hardware, or both. For example, the components 106 and 700-706 and their corresponding elements comprise one or more instructions stored on a computer-readable storage medium and executable by processors of one or more computing devices. When executed by the one or more processors, the computer-executable instructions of the artificial intelligence management system 104 causes a client device and/or a server device to perform the methods described herein. Alternatively, the components 106 and 700-706 and their corresponding elements comprise hardware, such as a special purpose processing device to perform a certain function or group of functions. Additionally, the components 106 and 700-706 and their corresponding elements comprise a combination of computer-executable instructions and hardware.

Furthermore, the components 106 and 700-706 of the artificial intelligence management system 104, for example, are implemented as one or more stand-alone applications, as one or more modules of an application, as one or more plug-ins, as one or more library functions or functions that are called by other applications, and/or as a cloud-computing model. Thus, in some embodiments, the components 106 and 700-706 of the artificial intelligence management system 104 are implemented as a stand-alone application, such as a desktop or mobile application. Furthermore, in alternative embodiments, the components 106 and 700-706 of the artificial intelligence management system 104 are implemented as one or more web-based applications hosted on a remote server. Alternatively, or additionally, the components of the artificial intelligence management system 104 are implemented in a suit of mobile device applications or "apps." To illustrate, in some embodiments, the components of the artificial intelligence management system 104 are implemented in a content design application, including but not limited to ADOBE® PHOTOSHOP®, ADOBE® PHOTOSHOP® ELEMENTS, ADOBE® LIGHTROOM®, ADOBE® CREATIVE CLOUD®, ADOBE® INDESIGN®, ADOBE® PREMIER® ELEMENTS, ADOBE® PREMIER® PRO, ADOBE® PREMIER® RUSH®, ADOBE® SENSEI™, ADOBE® EXPERIENCE MANAGER, which are either registered trademarks or trademarks of Adobe Inc. in the United States and/or other countries.

Figure 8:
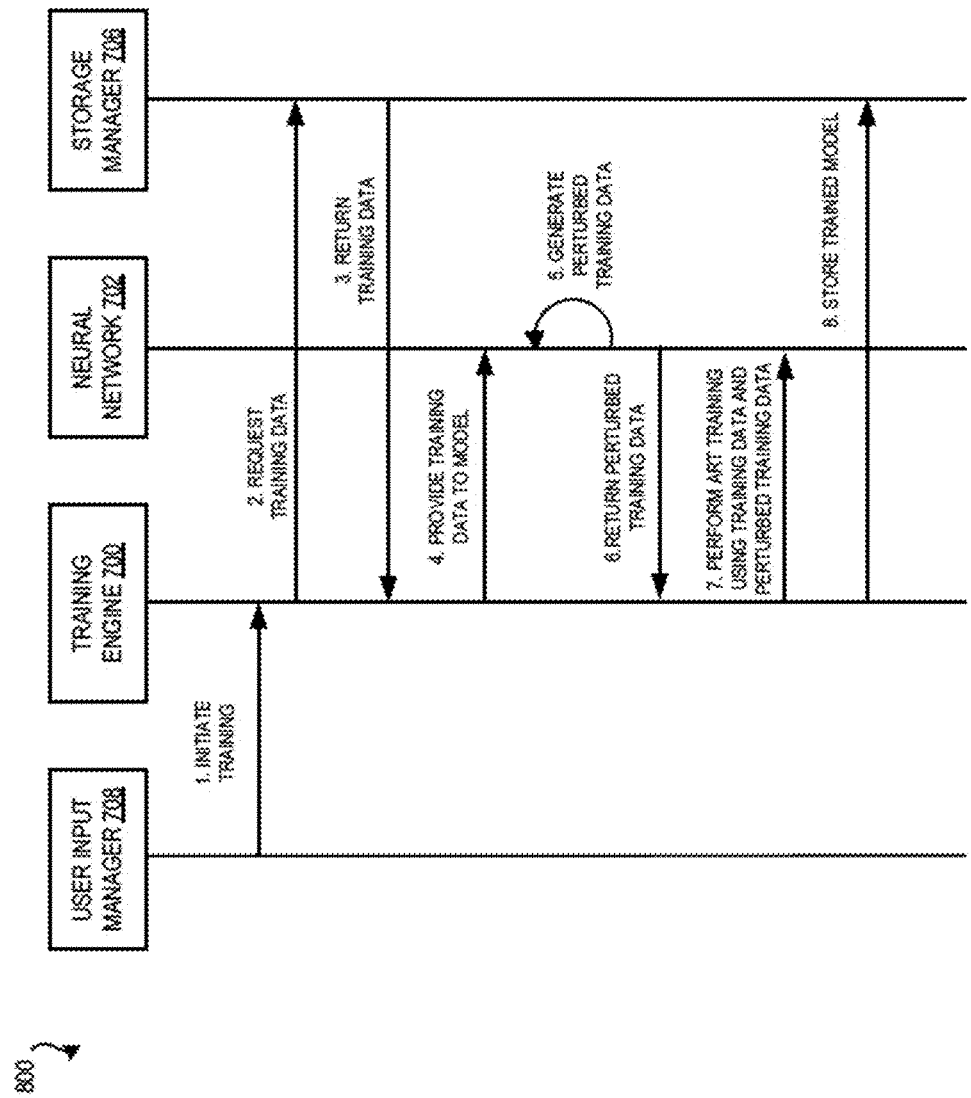
FIG. 8 illustrates a sequence diagram of an artificial intelligence management system in accordance with one or more embodiments.

FIG. 8 illustrates a sequence diagram 800 of an artificial intelligence management system in accordance with one or more embodiments. As shown in FIG. 8, user input manager 708 manages inputs received from a user, such as a request to initiate training of a machine learning model using training data available to the user. When a request is received, at numeral 1 the user input manager initiates training with training engine 700. In some embodiments, the training data is provided to the training engine with the request or a storage location is provided to the training engine indicating where the training data is stored.

At numeral 2, the training engine 700 requests training data from storage manager 706 using the storage location. For example, the training data, in some embodiments, is stored locally on a computing device implementing the attributionally robust training system. In alternative embodiments, the training data is accessible over one or more networks and stored in a remote location. In either case, storage manager 706 obtains the training data and returns the training data to the training engine 700 at numeral 3. As discussed, the training data includes, in some embodiments, training images and corresponding class labels to train an object classifier.

At numeral 4, the training engine provides the training data to neural network 702. The neural network analyzes the training data and generates perturbed training data at numeral 5. The perturbed training data is generated by maximizing a triplet loss function which receives the training image, the attribution map for the class label logit, and the attribution map for the highest probability logit that is not the class label logit. As discussed, the perturbed training data generated by maximizing the triplet loss is used to train the neural network to align its attribution maps with the object it is trained to detect. At numeral 6, the perturbed training data is made available to the training engine.

At numeral 7, the perturbed training data is used by the training engine to train neural network 702 using the attributionally robust training techniques described above. For example, the neural network is trained to minimize a combination of attribution loss (e.g., the triplet loss used to generate the perturbed images) and classification loss (e.g., loss based on whether objects are classified correctly). This is performed iteratively over multiple training epochs across the entire training data set. Once the neural network has been trained, the trained model is stored using storage manager 706, as shown at numeral 8. As discussed, the trained neural network is used to classify objects depicted in input images. Additionally, the attribution maps, which are more closely aligned with the detected objects than in conventional approaches, are used in weakly supervised object localization or image segmentation techniques to estimate bounding boxes or segmentation masks which are associated with the input images as metadata.

Figure 9:
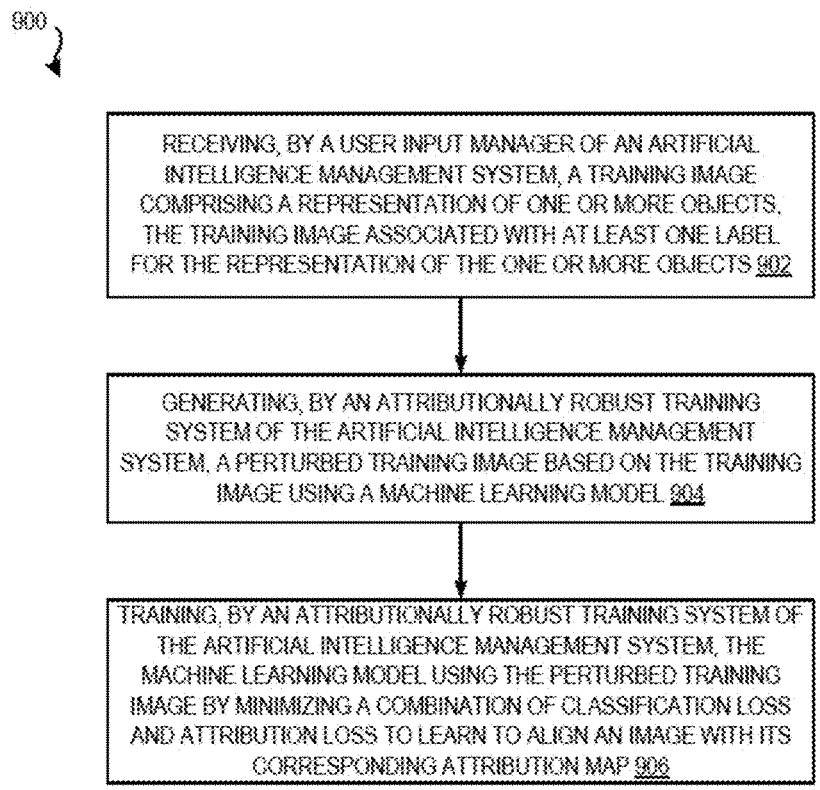
FIG. 9 illustrates a flowchart of a series of acts in a method of attributionally robust training of a machine learning model in accordance with one or more embodiments.

FIGS. 1-8, the corresponding text, and the examples, provide a number of different systems and devices that allows a user to facilitate selection of target individuals within digital visual media. In addition to the foregoing, embodiments also are described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10, in some embodiments, are performed with less or more steps/acts or the steps/acts are performed in differing orders. Additionally, in some embodiments, the steps/acts described herein are repeated or performed in parallel with one another or in parallel with different instances of the same or similar steps/acts.

FIG. 9 illustrates a flowchart of a series of acts in a method 900 of attributionally robust training of a machine learning model in accordance with one or more embodiments. In one or more embodiments, the method 900 is performed in a digital medium environment that includes the artificial intelligence management system 104. The method 900 is intended to be illustrative of one or more methods in accordance with the present disclosure and is not intended to limit potential embodiments. Alternative embodiments include additional, fewer, or different steps than those articulated in FIG. 9.

As illustrated in FIG. 9, the method 900 includes an act 902 of receiving a training image comprising a representation of one or more objects, the training image associated with at least one label for the representation of the one or more objects. In some embodiments, the training image is received using the user input manager 708 of the artificial intelligence management system. The training image includes a digital image or a digital video (e.g., frames of a digital video) and associated labels. The labels include class labels for objects depicted in the training images. In some embodiments, the training labels include bounding boxes As illustrated in FIG. 9, the method 900 includes an act 904 of generating a perturbed training image based on the training image using a machine learning model. In some embodiments, the machine learning model is a neural network or other machine learning model trained to perform image classification (e.g., a "classifier"). In some embodiments, the attributionally robust training system is used to generate the perturbed image. In some embodiments, the perturbed training image is generated by extracting a first attribution map from a logit of the neural network associated with a class of the at least one label, extracting a second attribution map from a logit of the neural network associated with a highest probability that is not the ground truth class, and calculating the perturbed training image based on the training image, the first attribution map, and the second attribution map to maximize an attribution loss function.

As illustrated in FIG. 9, the method 900 includes an act 906 training the machine learning model using the perturbed training image by minimizing a combination of classification loss and attribution loss to learn to align an image with its corresponding attribution map. For example, the machine learning model is trained such that an object identified in an input image is aligned with a corresponding attribution map extracted from the machine learning model. As discussed, the attributionally robust training system of the artificial intelligence management system is used to perform training. Training includes iteratively training the neural network using a plurality of perturbed training images generated based on a plurality of training images over a plurality of training epochs.

FIG. 10 illustrates a flowchart of a series of acts in a method 1000 of performing image classification using an attributionally robust trained machine learning model in accordance with one or more embodiments. In one or more embodiments, the method 1000 is performed in a digital medium environment that includes the artificial intelligence management system 104. The method 1000 is intended to be illustrative of one or more methods in accordance with the present disclosure and is not intended to limit potential embodiments. Alternative embodiments include additional, fewer, or different steps than those articulated in FIG. 10.

As illustrated in FIG. 10, the method 1000 includes an act 1002 of receiving an input digital image comprising representations of one or more objects. For example, as discussed, the input digital image includes a digital image or digital video which depicts one or more objects which a neural network has been trained to identify. In some embodiments, a user input manager of an artificial intelligence management system or of a content design application is used to receive the input digital image.

As illustrated in FIG. 10, the method 1000 includes an act 1004 of determining an attribution map for the input digital image using an image classification neural network trained by minimizing a combination of a classification loss and an alignment loss on perturbed training images to learn alignment between training images and corresponding training image attribution maps. In some embodiments, a content design application is used to determine the attribution map. As discussed, an image classification neural network (e.g., a classifier) is trained using an attributionally robust training system to improve alignment of the input image and its attribution map. The attribution map is visualized as a heatmap, where each pixel is associated with a value corresponding to how important that pixel was to the classification decision made by the neural network. As a result, more important portions of the input image appear "hotter" than less important portions of the image.

As discussed, the attributionally robust training system is used to train the neural network. In some embodiments, the neural network is a trained classifier and the attributionally robust training system further trains or fine tunes the neural network to improve alignment between an input image and the attribution map. The attributionally robust training system receives an input training image and associated training label, calculate a perturbed training image using the image classification neural network, and train the image classification neural network using the perturbed image. In some embodiments, to calculate a perturbed image the attributionally robust training system extracts a first attribution map from a logit associated with a class of the training label, extract a second attribution map from a logit associated with a highest probability that is not the ground truth class, and calculate the perturbed training image based on the training image, the first attribution map, and the second attribution map to maximize an attribution loss function. In some embodiments, the first attribution map and the second attribution map are gradient attribution maps. In some embodiments, the attribution loss function is a soft margin triplet loss function.

As illustrated in FIG. 10, the method 1000 includes an act 1006 of performing at least one of object localization or image segmentation on the input digital image based on the attribution map for the input digital image. In some embodiments, the content design application performs object localization or image segmentation on the input image. In some embodiments, performing at least one of object localization or image segmentation on the input digital image based on the attribution map for the input digital image includes determining a bounding box for the representations of the one or more objects based on the attribution map. In some embodiments, performing at least one of object localization or image segmentation on the input digital image based on the attribution map for the input digital image includes determining a segmentation mask for the input digital image based on the attribution map.

Figure 11:
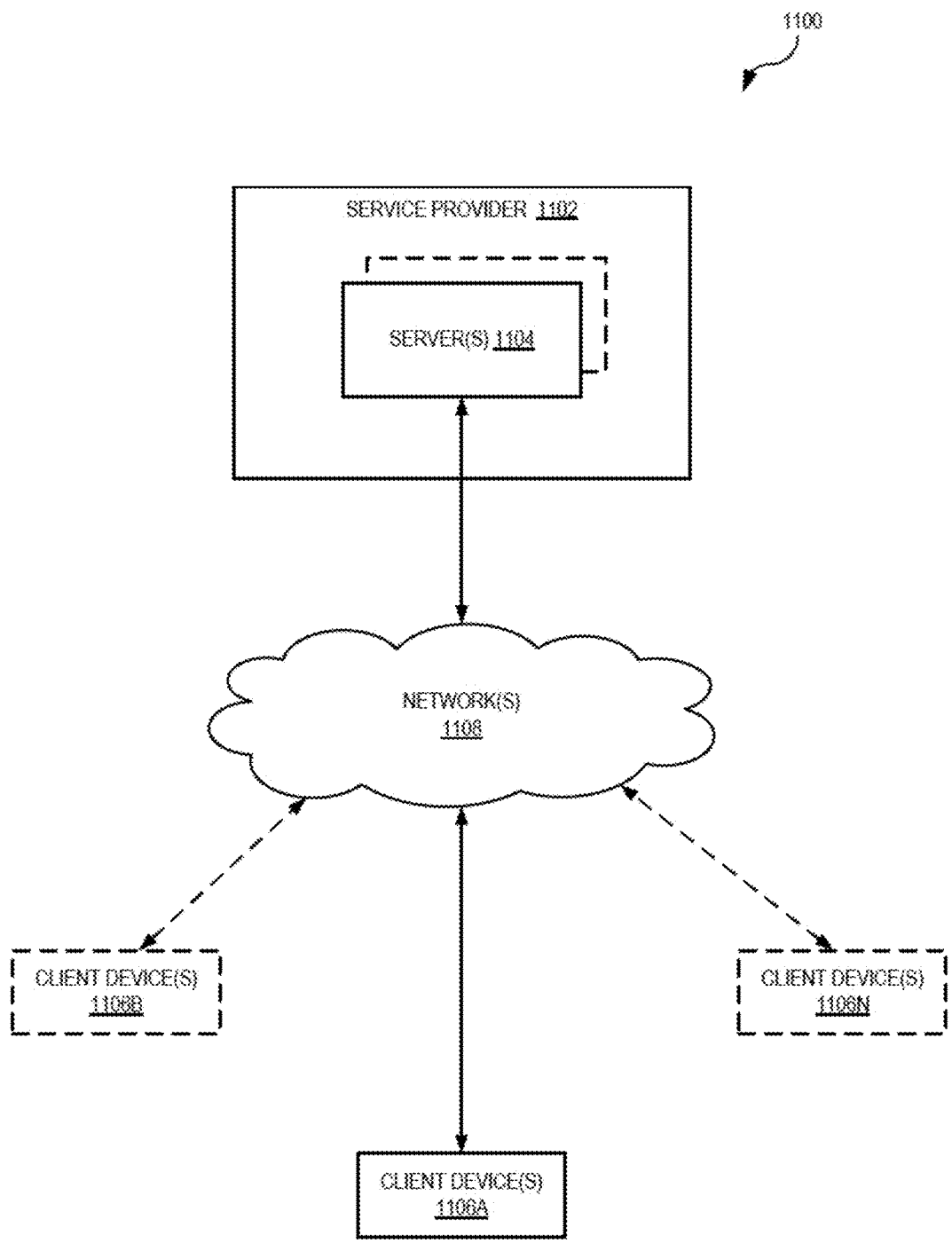
FIG. 11 illustrates a schematic diagram of an exemplary environment in which the artificial intelligence management system operates in accordance with one or more embodiments.

FIG. 11 illustrates a schematic diagram of an exemplary environment 1100 in which the artificial intelligence management system operates in accordance with one or more embodiments. In one or more embodiments, the environment 1100 includes a service provider 1102 which includes one or more servers 1104 connected to a plurality of client devices 1106A-1106N via one or more networks 1108. The client devices 1106A-1106N, the one or more networks 1108, the service provider 1102, and the one or more servers 1104 communicate with each other or other components using any communication platforms and technologies suitable for transporting data and/or communication signals, including any known communication technologies, devices, media, and protocols supportive of remote data communications, examples of which are described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N directly communicate with the one or more servers 1104, bypassing the network 1108. Or alternatively, the client devices 1106A-1106N directly communicate with each other. The service provider 1102 is a public cloud service provider which owns and operates their own infrastructure in one or more data centers and provides this infrastructure to customers and end users on demand to host applications on the one or more servers 1104. The servers include one or more hardware servers (e.g., hosts), each with its own computing resources (e.g., processors, memory, disk space, networking bandwidth, etc.) which are securely divided between multiple customers, each of which host their own applications on the one or more servers 1104. In some embodiments, the service provider is a private cloud provider which maintains cloud infrastructure for a single organization. The one or more servers 1104 similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 has additional or alternative components. For example, the environment 1100 is implemented on a single computing device with the artificial intelligence management system 114. In particular, the artificial intelligence management system 104 is implemented in whole or in part on the client device 1102A.

As illustrated in FIG. 11, the environment 1100 includes client devices 1106A-1106N. The client devices 1106A-1106N comprise any computing device. For example, client devices 1106A-1106N comprise one or more personal computers, laptop computers, mobile devices, mobile phones, tablets, special purpose computers, TVs, or other computing devices, including computing devices described below with regard to FIG. 12. Although three client devices are shown in FIG. 11, it is appreciated that client devices 1106A-1106N comprise any number of client devices (greater or smaller than shown).

Moreover, as illustrated in FIG. 11, the client devices 1106A-1106N and the one or more servers 1104 communicate via one or more networks 1108. The one or more networks 1108 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 include any suitable network over which the client devices 1106A-1106N access service provider 1102 and server 1104, or vice versa. The one or more networks 1108 are discussed in more detail below with regard to FIG. 12.

In addition, the environment 1100 also includes one or more servers 1104. The one or more servers 1104 generate, store, receive, and transmit any type of data, including training data 200, or other information. For example, a server 1104 receives data from a client device, such as the client device 1106A, and send the data to another client device, such as the client device 1102B and/or 1102N. The server 1104 also transmits electronic messages between one or more users of the environment 1100. In one example embodiment, the server 1104 is a data server. The server 1104 also comprises a communication server or a web-hosting server. Additional details regarding the server 1104 are discussed below with respect to FIG. 12.

As mentioned, in one or more embodiments, the one or more servers 1104 include or implement at least a portion of the artificial intelligence management system 114. In particular, the artificial intelligence management system 104 comprise an application running on the one or more servers 1104 or a portion of the artificial intelligence management system 104 is downloaded from the one or more servers 1104. For example, the artificial intelligence management system 104 includes a web hosting application that allows the client devices 1106A-1106N to interact with the artificial intelligence management system on the one or more servers 1104. To illustrate, in one or more embodiments of the environment 1100, one or more client devices 1106A-1106N accesses a webpage supported by the one or more servers 1104. In particular, the client device 1106A runs a web application (e.g., a web browser) to allow a user to access, view, and/or interact with a webpage or website hosted at the one or more servers 1104.

As just described, the artificial intelligence management system 104 is implemented in whole, or in part, by the individual elements 1102-1108 of the environment 1100. It is appreciated that although certain components of the artificial intelligence management system 104 are described in the previous examples with regard to particular elements of the environment 1100, various alternative implementations are possible. For instance, in one or more embodiments, the artificial intelligence management system 104 is implemented on any of the client devices 1106A-N. Similarly, in one or more embodiments, the artificial intelligence management system 104 is implemented on the one or more servers 1104. Moreover, different components and functions of the artificial intelligence management system 104 are implemented separately among client devices 1106A-1106N, the one or more servers 1104, and the network 1108.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media are any available media that are accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is also implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Some embodiments of the present disclosure also are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model is composed of various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model also is deployed using different deployment models such as private cloud, community cloud, public cloud, hybrid cloud, and so forth. In this description and in the claims, a "cloud-computing environment" is an environment in which cloud computing is employed.

Figure 12:
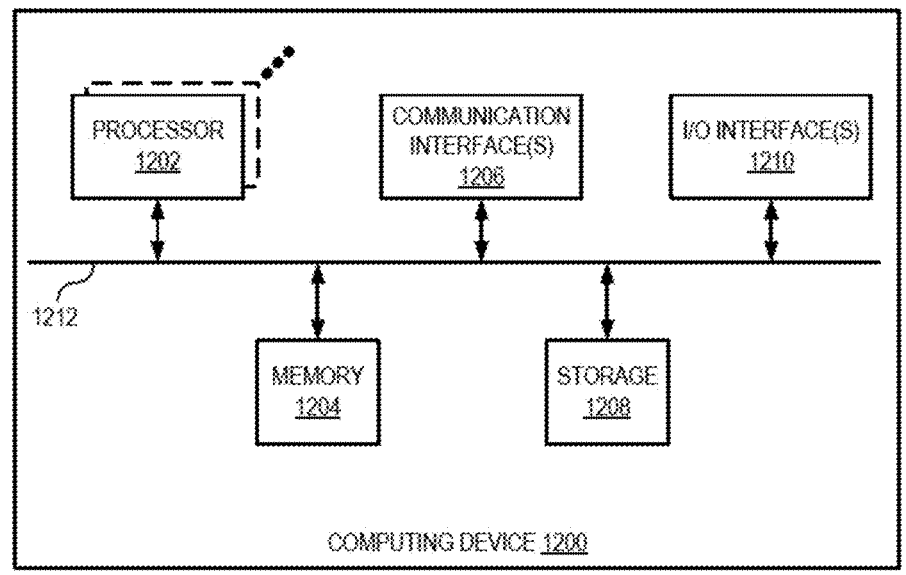
FIG. 12 illustrates a block diagram of an exemplary computing device in accordance with one or more embodiments.

FIG. 12 illustrates a block diagram of an exemplary computing device 1200 in accordance with one or more embodiments. One appreciates that one or more computing devices such as the computing device 1200 implement the artificial intelligence management system. As shown by FIG. 12, the computing device comprises a processor 1202, memory 1204, one or more communication interfaces 1206, a storage device 1208, and one or more I/O devices/interfaces 1210. In certain embodiments, the computing device 1200 includes fewer or more components than those shown in FIG. 12. Components of computing device 1200 shown in FIG. 12 are described in additional detail below.

In particular embodiments, processor(s) 1202 includes hardware for executing instructions, such as those making up a computer program. As an example, and not by way of limitation, to execute instructions, processor(s) 1202 retrieve (or fetch) the instructions from an internal register, an internal cache, memory 1204, or a storage device 1208 and decode and execute them. In various embodiments, the processor(s) 1202 include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 is used for storing data, metadata, and programs for execution by the processor(s). The memory 1204 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 includes internal or distributed memory.

The computing device 1200 further includes one or more communication interfaces 1206. A communication interface 1206 includes hardware, software, or both. The communication interface 1206 provides one or more interfaces for communication (such as, for example, packet-based communication) between the computing device and one or more other computing devices 1200 or one or more networks. As an example and not by way of limitation, communication interface 1206 includes a network interface controller (NIC) or network adapter for communicating with an Ethernet or other wire-based network or a wireless NIC (WNIC) or wireless adapter for communicating with a wireless network, such as a WI-FI. The computing device 1200 further includes a bus 1212. The bus 1212 comprises hardware, software, or both that couples components of computing device 1200 to each other.

The computing device 1200 includes a storage device 1208 includes storage for storing data or instructions. As an example, and not by way of limitation, storage device 1208 comprises a non-transitory storage medium described above. The storage device 1208 includes a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 include a mouse, keypad or a keyboard, a touch screen, camera, optical scanner, network interface, modem, other known I/O devices or a combination of such I/O devices/interfaces 1210. The touch screen is activated with a stylus or a finger.

The I/O devices/interfaces 1210 include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performed with less or more steps/acts or the steps/acts are performed in differing orders. Additionally, the steps/acts described herein are repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving, by a user input manager of an artificial intelligence management system, a training image comprising a representation of one or more objects, the training image associated with at least one label for the representation of the one or more objects;
   generating, by an attributionally robust training system of the artificial intelligence management system, a perturbed training image based on the training image using a machine learning model by extracting attribution maps from logits of the machine learning model and calculating the perturbed training image based on the training image and the attribution maps to maximize an attribution loss; and
   training, by an attributionally robust training system of the artificial intelligence management system, the machine learning model using the perturbed training image by minimizing a combination of classification loss and the attribution loss to learn to align an image with its corresponding attribution map.

2. The method of claim 1, wherein the attribution maps include a first attribution map from a logit of the machine learning model associated with a class of the at least one label and a second attribution map from a logit of the machine learning model associated with a highest probability class other than the class of the at least one label.

3. The method of claim 2 wherein the first attribution map and the second attribution map are gradient attribution maps.

4. The method of claim 2, wherein the attribution loss function is a soft margin triplet loss function.

5. The method of claim 1, wherein training the machine learning model using the perturbed training image by minimizing a combination of classification loss and attribution loss to learn to align an image with its corresponding attribution map further comprises:
   iteratively training, by an attributionally robust training system of the artificial intelligence management system, the machine learning model using a plurality of perturbed training images generated based on a plurality of training images over a plurality of training epochs.

6. The method of claim 1, further comprising:
   receiving, by a digital content application, an input digital image comprising representations of one or more objects;

determining, by the digital content application, an attribution map for the input digital image using the machine learning model; and performing, by the digital content application, at least one of object localization or image segmentation for the input digital image based on the attribution map for the input digital image.

7. The method of claim 6, wherein perform at least one of object localization or image segmentation for the input digital image based on the attribution map for the input digital image, further comprises:

determining a segmentation mask for the input digital image based on the attribution map; or determining a bounding box for the representations of the one or more objects based on the attribution map.

8. A system comprising:

a computing device implementing an artificial intelligence management system, the artificial intelligence management system comprising:

a user input manager to receive a training image comprising a representation of one or more objects, the training image associated with at least one label for the representation of the one or more objects; and an attributionally robust training system to:

generate a perturbed training image based on the training image using a classifier by extracting attribution maps from logits of the classifier and calculating the perturbed training image based on the training image and the attribution maps to maximize an attribution loss; and train the classifier using the perturbed training image by minimizing a combination of classification loss and the attribution loss to learn to align an image with its corresponding attribution map.

9. The system of claim 8, wherein the attribution maps include a first attribution map from a logit of the classifier associated with a class of the at least one label and a second attribution map from a logit of the classifier associated with a highest probability class other than the class of the at least one label.

10. The system of claim 9 wherein the first attribution map and the second attribution map are gradient attribution maps.

11. The system of claim 9, wherein the attribution loss function is a soft margin triplet loss function.

12. The system of claim 8, wherein to train the classifier using the perturbed training image by minimizing a combination of classification loss and attribution loss to learn to align an image with its corresponding attribution map, the attributionally robust training system is further to:

iteratively train the classifier using a plurality of perturbed training images generated based on a plurality of training images over a plurality of training epochs.

13. A system comprising:

means for receiving a training image comprising a representation of one or more objects, the training image associated with at least one label for the representation of the one or more objects;

means for generating a perturbed training image based on the training image using a neural network by extracting attribution maps from logits of the neural network and calculating the perturbed training image based on the training image and the attribution maps to maximize an attribution loss; and means for training the neural network using the perturbed training image by minimizing a combination of classification loss and the attribution loss to learn to align an image with its corresponding attribution map.

14. The system of claim 13, wherein the attribution maps include a first attribution map from a logit of the neural network associated with a class of the at least one label and a second attribution map from a logit of the neural network associated with a highest probability class other than the class of the at least one label.

15. The system of claim 14 wherein the first attribution map and the second attribution map are gradient attribution maps.

16. The system of claim 14, wherein the attribution loss is a soft margin triplet loss function.

17. The system of claim 13, wherein the means for training the neural network using the perturbed training image by minimizing a combination of classification loss and attribution loss to learn to align an image with its corresponding attribution map further comprises:

means for iteratively training the neural network using a plurality of perturbed training images generated based on a plurality of training images over a plurality of training epochs.

18. The system of claim 13, further comprising:

means for receiving an input digital image comprising representations of one or more objects;

means for determining an attribution map for the input digital image using the neural network; and means for performing at least one of object localization or image segmentation for the input digital image based on the attribution map for the input digital image.

19. The system of claim 18, wherein the means for performing at least one of object localization or image segmentation for the input digital image based on the attribution map for the input digital image, further comprises:

means for determining a bounding box for the representations of the one or more objects based on the attribution map.

20. The system of claim 18, wherein the means for performing at least one of object localization or image segmentation for the input digital image based on the attribution map for the input digital image, further comprises:

means for determining a segmentation mask for the input digital image based on the attribution map.

* * * * *